United States Patent [19]

Herkes et al.

[11] 4,125,051
[45] Nov. 14, 1978

[54] TAMPERPROOF FASTENER

[75] Inventors: Daniel J. Herkes, Aurora; David P. Wagner, Geneva, both of Ill.

[73] Assignee: Illinois Tool Works Inc., Chicago, Ill.

[21] Appl. No.: 805,057

[22] Filed: Jun. 9, 1977

[51] Int. Cl.² ............................................. F16B 23/00
[52] U.S. Cl. ........................................ 85/45; 81/119
[58] Field of Search ............... 85/45, 9 R; 145/50 A, 145/50 R; 81/119, 121 R

[56] References Cited

FOREIGN PATENT DOCUMENTS

| 110,624 | 4/1964 | Czechoslovakia | 85/45 |
| 67,333 | 8/1948 | Denmark | 85/45 |
| 466,526 | 5/1914 | France | 85/45 |
| 1,232,468 | 4/1960 | France | 85/45 |
| 13,555 of | 1913 | United Kingdom | 85/45 |
| 562,248 | 6/1944 | United Kingdom | 85/45 |

Primary Examiner—Ramon S. Britts
Attorney, Agent, or Firm—Thomas W. Buckman; Robert W. Beart

[57] ABSTRACT

A threaded fastener with a low profile head designed to prohibit unauthorized removal. The upper surface of the head is configured to include a very short cylindrical boss, coaxial of the fastener and a plurality of ribs extending radially outwardly therefrom formed on an otherwise flat, circular flange. The ribs include a perpendicularly disposed driving surface of low height extending from the flat surface and an angled camming surface intersecting with the driving surface.

6 Claims, 6 Drawing Figures

TAMPERPROOF FASTENER

BACKGROUND OF THE INVENTION

The present invention relates to fasteners and more particularly to fasteners having a head configuration which is configured so as to prevent unauthorized removal thereof.

Heretofore a wide variety of prior art head designs have been disclosed relative to tamperproof features. Many of these designs incorporate internal driving recesses configured to accept only a specially configured tool. A wide variety of head styles using an internal driving surface provide rotary inducing abutment surfaces only in the tightening direction with camming surfaces extending in the direction which would tend to remove the fastener. The use of internal driving recesses generally requires a head with a certain volume of material and are typically conically shaped to provide the necessary volume. In order to provide the proper abutting surfaces for high torque conditions, prior art tamperproof systems require a head with a high profile if they are of the flat bearing surface variety. The presence of any high profile screw offers the possibility that a tight clamping or wrenching can be obtained on the periphery of the head, thus leading to an unauthorized removal.

Other disadvantages of the prior art tamperproof fasteners reside in the inability to critically center a driving tool on the fastener so that the tool is not inclined relative to the axis of the fastener. This becomes important when relatively low or small abutment surfaces are relied upon on the fastener head to transmit high torque.

SUMMARY OF THE INVENTION

The present invention, which will be described subsequently in greater detail, essentially comprises a flat, thin, wafer-like head having an upper surface which includes a plurality of radially extending low-standing driving surfaces extending perpendicular to the flat surfaces. The driving surfaces intersect with camming surfaces which extend at an acute angle from the flat surface to the intersection with the driving surface. The centermost region of the flat head includes a low-standing, stub-like cylindrical boss of a height generally not exceeding the thickness of the flat head and preferably substantially equal to the height of the driving surfaces of the ribs. A fastener head of this design thus avoids the various aforesaid draw backs of the prior art head designs.

It is therefore an object of the invention to provide a low profile head configuration which effectively prevents unauthorized removal of the fastener.

It is a further object of the invention to provide a tamperproof fastener which includes structure to precisely center an associated tool on the fastener so that the tool is not inclined to the longitudinal axis during driving.

A still further object of the invention is to provide a tamperproof head which can be driven by a tool contacting the head solely on the top surface thereof thus preventing the necessity of the tool surrounding the periphery of the fastener.

An advantage of the design of the present invention is the ability to transmit torque efficiently and effectively to a low profile tamperproof head on perpendicular torque receiving surfaces of relatively low height.

DESCRIPTION OF THE PREFERRED EMBODIMENT

Figure 1:
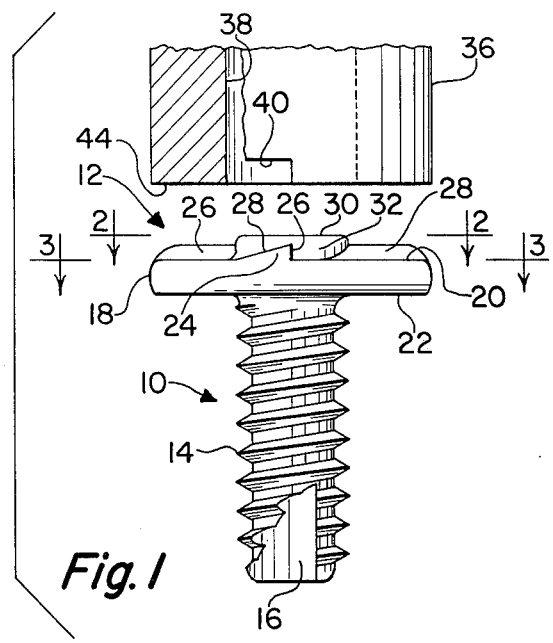
FIG. 1 is a side elevational view of the fastener together with an associated driving tool, in partial section, shown just prior to application to the fastener.
Figure 2:
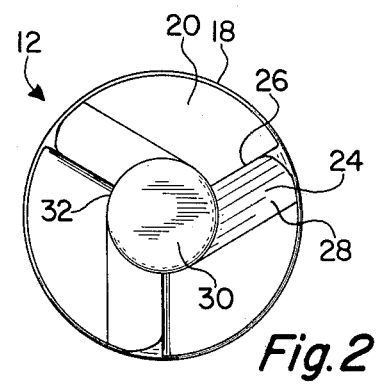
FIG. 2 is a top plan view of the fastener as taken along the lines 2—2 of FIG. 1.

Referring to FIGS. 1-4, a fastener 10 will be shown to basically include a threaded shank 14 and a radially extending, substantially flat head 12. The tamperproof head 12 comprises a flat, pancake-like radially extending flange 18, having a circular periphery creating a flat bearing surface 22 extending perpendicular to the axis of the fastener. A substantial percentage of the surface area of the upper surface of this head is provided with regions 20 which are flat and extend perpendicularly to the axis of the fastener. Radially extending ribs 24 are formed on the outer remaining surface area of the fastener head. Ribs 24 include a first, driving surface 26 extending perpendicularly to the surface 20 and a second, camming surface 28 extending at an acute angle to the surface 20 and intersecting surface 26 at an apex. The flat driving surface 26 is of a very short height, preferably not greater than the thickness of the flange 18.

A cylindrical boss 30 is formed coaxial with the longitudinal axis of the fastener and extends upwardly from the surface 20. The boss 30 likewise is of a very short vertical height, preferably not substantially more than the height of the surfaces 26 and generally of a height equal to the thickness of the flange 18. The boss 30 will provide side wall sections 32 extending perpendicularly to the flat surface regions 20 for purposes to be described later herein. The diameter of the boss will preferably be of a diameter substantially equal to shank 14 to balance the advantages of a large area of driving surfaces and a sufficient volume of boss to stabilize the driving.

The abutment surfaces 26 are preferably formed so as to lie on planes extending perpendicularly to the surface 20 which intersect the longitudinal axis of the fastener. This permits the rotary force applied to the fastener to be solely perpendicular to the radius thus eliminating any force vectors which tend to cam or disassociate the driver from the abutment surfaces.

Figure 4:
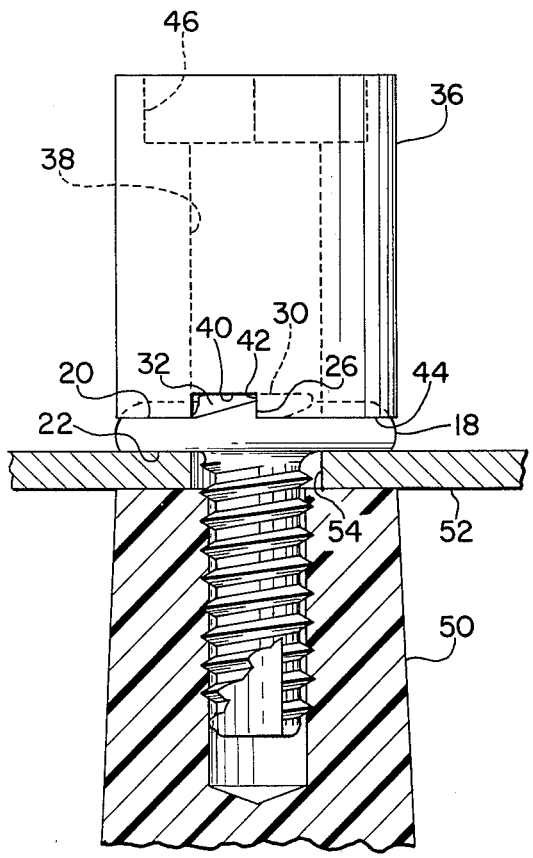
FIG. 4 is a side elevational view, in partial section, showing the fastener in the final stage of application into a bore in a workpiece, through the use of a special tool.

The fastener is typically used in a workpiece such as a boss 50 on a primary support surface to clamp a secondary workpiece 52. A clearance hole 54 may be provided in the secondary workpiece to facilitate the association of the shank 14 with the workpiece. The fastener preferably will include a thread-cutter slot 16 which permits the use of the fastener in a blind bore application as shown in FIG. 4. Tapping applications create high torque driving requirements which are adequately handled by the novel design of the head 12.

More specific reference to FIGS. 1 and 4 will describe the advantageous operation of the fastener when used in conjunction with an associated special tool 36.

Figure 3:
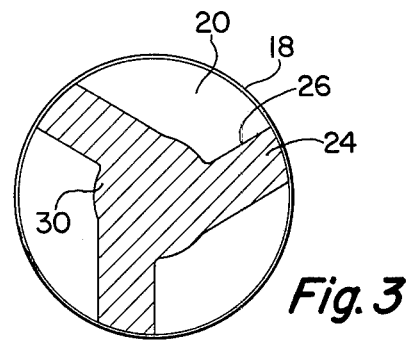
FIG. 3 is a transverse sectional view of the fastener as taken along lines 3—3 of FIG. 1.

The tool 36, which is described in more detail in co-pending, commonly assigned, application Ser. No. 805,056, is basically a cylindrical member having a cylindrical bore 38 of a diameter substantially equal to the diameter of the cylindrical bore 30 on the fastener and may be provided with a surface 46 to transmit torque from a primary source such as a power tool (not shown). The front face surfaces 44 are flat and lie on a plane perpendicular to the axis of the tool 36 to matingly engage associated flat surface regions 20 of the fastener. FIG. 3 illustrates the large percentage of surface regions 20 which contribute to the stabilizing functions of the invention. Radially extending recesses 40 are formed in the fastener engaging surface and are generally rectangular in cross section of a height defined by primary driving surface 42 which is just great enough to accept the height of the abutment surface 26 on the fastener. The width of the recess is preferably no greater than the width necessary to receive the camming surfaces 28 so as to allow the flat front face surfaces 44 to contact the flat surface 20 on the fastener. The cooperation of the flat surfaces 44 with the flat upper surfaces 20 on the fastener and the inner periphery of the bore 38 on the tool with the side walls 32 of the boss on the fastener carefully and critically stabilizes and centers the tool on the fastener and prevents the tool from cocking out of the axis of the fastener. This becomes essential when driving surfaces, such as 26, of low height are to be used to drive a threaded fastener with the high torques necessary in certain applications. Without such a centering and stabilizing feature designed in the fastener head, the associated tool would tend to rock and disassociate itself from proper mating between the driving surfaces of the tool and the driving surfaces of the fastener and at the very least cause unequal forces to be applied to the fastener.

It is noted that the design of the fastener head enables the driving to be done solely upon the interengagement of the tool with the upper surface of the fastener and not in any way involves the surrounding or grasping of the outer periphery of the fastener with the tool. This becomes important in space limited applications.

The novel configuration described herein also permits rather large, flat bearing surface 22 to be provided to a fastener with the ribs 24 serving to strengthen an otherwise very thin radially extending flange 18 which becomes important in high clamp load applications.

Figure 5:
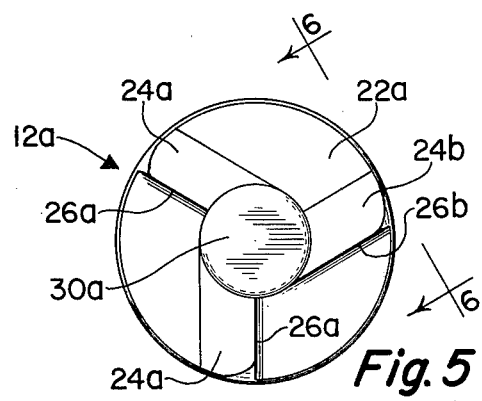
FIG. 5 is a top plan view of an alternate embodiment of the fastener.
Figure 6:
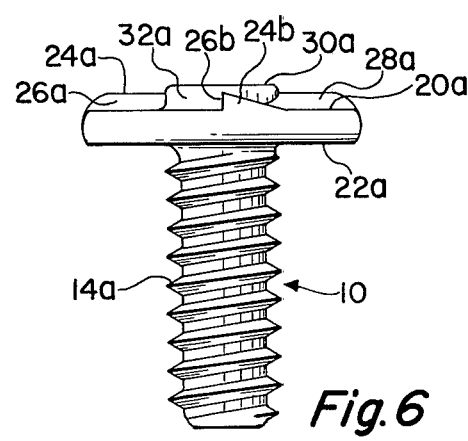
FIG. 6 is a side elevational view of the embodiment that is shown in FIG. 5.

While the fastener is intended to prevent unauthorized removal of a fastener after it has been driven, it is frequently desirable to selectively remove these fasteners for a variety of purposes. With this in mind an alternate embodiment of the invention is shown in FIGS. 5 and 6. In this embodiment, like reference numerals with the addition of suffixes a, and in a certain instance b, are intended to identify similar elements to those shown in FIGS. 1-4. Ribs 24a are formed on an otherwise flat surface 20a and are configured so that the perpendicularly arranged driving surfaces 26a lie along a radius of the threaded fastener. However, one such rib 24b may be configured so that the associated driving abutment surface 26b and its camming surface 24b are reversed from the driving and camming surfaces 26a and 28a, respectively. Thus 26b is positioned so that a force applied in the retrograde direction by a tool, such as 36, will at least apply a turning torque to the fastener. While this torque transmission is not as efficient as that applied in the on direction, it does prevent a selective removal of the fastener if so desired.

Turning to FIG. 3, it will be clearly illustrated that a substantial region of the top surface of the driving head of this invention is flat and does not in and of itself form any part of the torque transmitting surfaces. However, the flat surface regions 20 do provide equally distributed large surface areas between the preferred three radial ribs 24 onto which the driver can be positioned and stabilized with the aid of the boss 30.

It is important to note that the overall configuration created by the novel cooperation of elements on the driving head presents a very low profile head which does not provide sufficient peripheral surface on which to grasp or clamp the fastener to remove except through the use of a special tool as suggested herein. An external drive fastener of the type described will not collect dirt and other foreign substances which typically create problems in the use of internal drive systems.

Thus it is apparent that there has been provided, in accordance with the invention, a low profile, tamperproof, external drive fastener head that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

We claim:

1. A fastener member with a low profile, tamperproof head and a threaded shank depending axially therefrom, said head comprising a radially extending, annular, thin, flange having a thickness not appreciably greater than the pitch of the threads on the shank forming a flat, lower bearing surface and an upper, driving surface, the upper surface including flat surface regions parallel to said lower surface and forming a substantial portion of said upper surface, three equally spaced generally radially extending protuberances formed on said upper surface extending upwardly therefrom, each protuberance including an abutment surface extending perpendicularly upwardly from the upper surface intersecting with a camming surface providing means to only accept and transmit a rotary force in one direction of rotation, each protuberance extending upwardly a short distance not generally exceeding the thickness of the flange, a centrally located annular cylindrical boss, with smooth walls, extending upwardly from the upper surface having a diameter substantially less than the diameter of the flange and a height not substantially greater than the thickness of the flange providing centering and stabilizing means during the driving of the fastener, the flat upper surface region, smooth surfaced short cylindrical boss and three equally spaced protuberances in combination creating means to accurately and predictably align a mating driving tool with the head of the fastener to insure that sufficient torque be applied to the relatively short abutment surface of the protuberances so that the low profile of the head may be maintained insuring that the fastener member will not accept unauthorized removal forces.

2. The fastener member of claim 1, wherein the cylindrical boss has a diameter substantially equal to the diameter of the threaded shank.

3. The fastener member of claim 1, wherein the protuberances extend from the boss to the outer periphery of the flange with the abutment surface on each protuberance being of uniform height along its radial extent.

4. The fastener member of claim 1, wherein the abutment surfaces lie on longitudinal planes intersecting the longitudinal axis of the fastener.

5. The fastener member of claim 1, wherein a plurality of the protuberances are configured so that the camming surface leads the abutment surface in the direction of rotation of the fastener which causes it to be fed into an associated workpiece.

6. The fastener member of claim 5, wherein at least one of the protuberances is configured so that the camming surface leads the abutment surface in the direction of rotation of the fastener which causes it to be retracted from an associated workpiece.

* * * * *